United States Patent [19]

Baumgartner et al.

[11] 4,039,036
[45] Aug. 2, 1977

[54] WEIGHING APPARATUS OF THE ELECTROMAGNETIC LOAD COMPENSATION TYPE INCLUDING FILTER MEANS

[75] Inventors: Max Baumgartner; Anton Bucher, both of Stafa; Diethelm Utzinger, Zurich, all of Switzerland

[73] Assignee: Mettler Instrumente AG, Zurich, Switzerland

[21] Appl. No.: 649,974

[22] Filed: Jan. 19, 1976

[30] Foreign Application Priority Data

Feb. 4, 1975 Switzerland .................. 1339/75

[51] Int. Cl.$^2$ ............................................. G01G 7/00
[52] U.S. Cl. ...................................... 177/212; 177/185;
177/210 C; 177/210 EM; 318/629; 333/75
[58] Field of Search ............ 177/212, 210 C, 210 EM,
177/185; 333/75; 318/611, 619, 629

[56] References Cited

U.S. PATENT DOCUMENTS

| | | | |
|---|---|---|---|
| 2,167,079 | 7/1939 | Landon | 333/75 X |
| 2,734,736 | 2/1956 | Payne | 177/212 X |
| 3,172,493 | 3/1965 | Koch et al. | 177/212 X |
| 3,639,825 | 2/1972 | MacMullan | 318/621 |
| 3,677,357 | 7/1972 | Baumgartner | 177/212 X |
| 3,753,472 | 8/1973 | Dybwad et al. | 177/212 X |
| 3,802,522 | 4/1974 | Thompson | 177/212 X |

*Primary Examiner*—Joseph W. Hartary
*Attorney, Agent, or Firm*—Lawrence E. Laubscher

[57] ABSTRACT

Weighing apparatus of the electromagnetic load compensation type is disclosed including zero-position detector means for generating a position signal that is a function of the extent to which a loaded weighing pan or the like is displaced from its no-load position, and regulating means responsive to said position signal for generating a compensating current for displacing the weighing pan toward its no-load position, characterized by the provision of filter means connected between the zero-position detector and the regulating means for suppressing the undesired extraneous interference acceleration signals produced, for example, by external shock or vibration forces imparted to the weighing apparatus. In one embodiment, the filter electrical components are constant, and in a second embodiment, means are provided for varying the electrical characteristics of at least some of the filter components as a function of the load applied to the weighing pan.

8 Claims, 5 Drawing Figures

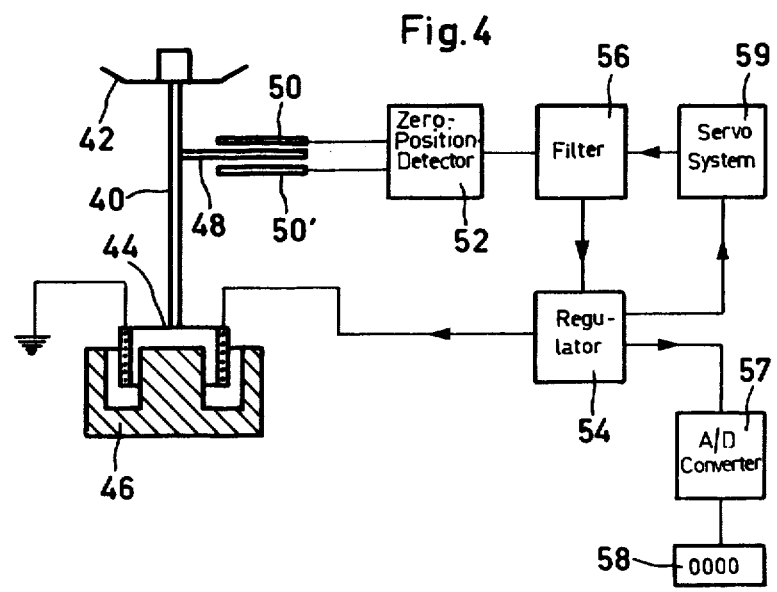
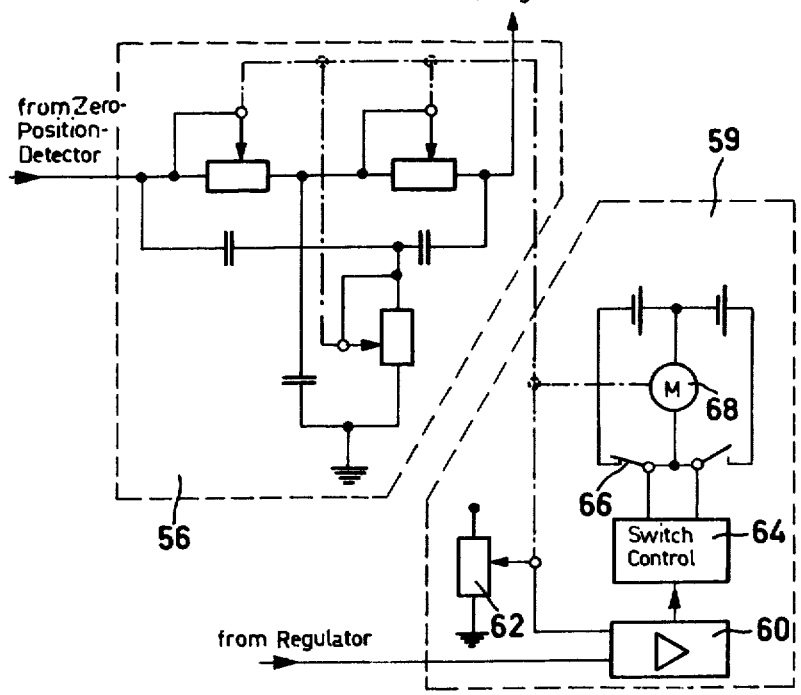

WEIGHING APPARATUS OF THE ELECTROMAGNETIC LOAD COMPENSATION TYPE INCLUDING FILTER MEANS

BRIEF DESCRIPTION OF THE PRIOR ART

Weighing apparatus of the electromagnetic load compensation type are well known in the prior art, as evidenced by the prior patents to Baumgartner U.S. Pat. No. 3,677,357, Strobel U.S. Pat. No. 3,688,854, Allenspach U.S. Pat. No. 3,786,884, as Baumann et al. U.S. Pat. Nos. 3,816,156 and 3,872,936. In these known systems, the displacement of a weighing pan from its normal no-load position is detected by zero-position detecting means which produce a position signal that is a function of the displacement of pan from its no-load position by the load. Regulator means responsive to the position signal produce a compensating current which is supplied to compensating coil means associated with the pan supporting structure to displace the pan toward its initial no-load position. Indicator means are provided for indicating the magnitude of the measured load as a function of the compensating current.

One inherent source of undesirable disturbances in scales of the above mentioned kind is represented by interference accelerations or oscillations which, for example, come from outside shocks and vibration and which are transmitted to the weighing apparatus. As a result of these shocks, interference frequencies are superimposed on the scanning signal of the zero-position detector, and these frequencies can severely impair the regulating performance of the scale and thus the stability of the indication reading. That applies particularly to the case of the resonance of the frequency of the interference acceleration with the inherent resonance frequency of the load receiving means; in certain cases, however, the inherent resonance frequency of the entire regulating circuit plays a role.

The present invention was developed to avoid the above and the other drawbacks of the known electromagnetic load compensating weighing apparatus.

SUMMARY OF THE INVENTION

The present invention was developed to provide an improved electromagnetic load compensation weighing apparatus that is less sensitive to outside influences, particularly interference oscillations with predetermined frequencies that have a deleterious effect upon the weighing operation and results.

According to a primary object of the invention, frequency selective filter means are connected between the zero-position detector means and the regulator means for suppressing the discrete interference frequencies that otherwise would resonate with the resonance frequency (or frequencies) of the weighing apparatus, thereby making it possible with a minor effort to stabilize the weight indication.

In accordance with a more specific object of the invention, the frequency-selective filter means is so designed that it will suppress interference oscillations with the inherent resonance frequency of the entire regulating circuit, including the load receiving member. This design is particularly suited for scales with a dead-load which is large compared to the weighing range, where, consequently, the inherent resonance frequency changes only little as a function of the mass of the material to be weighed (for example, in the case of microscales).

Frequently — for example in scales with weighing pans which are suspended in a pendulum fashion — two or three inherent resonance frequencies can appear and cause interference. In such cases, in accordance with another object of the invention, a filter network is preferably provided which is operable to suppress several discrete frequencies.

In scales with a dead-load which is low in relation to the weighing range, there is a noticeable change in the value of the inherent frequency as the scale is loaded down. According to a further object of the invention, the filter means includes capacitance and impedance components at least some of which have variable electrical characteristics, and means are provided for varying these characteristics as a function of load.

The filter means preferably comprises a double-T structure made up of impedances and condensers. The double-T structure gives the filter the characteristics of a high-pass and low-pass band-rejection filter, whereby the design of the components facilitates any practically desired dimensioning of the band-rejection filter width. The use of resistance and capacitance members is preferred because of economy and the easier adjustment and equalization; basically however inductance and capacitance members can also be used.

BRIEF DESCRIPTION OF THE FIGURES

FIG. 4 is a block electrical diagram of the second embodiment including a weighing apparatus which does not use a balance beam; and FIG. 5 illustrates by electrical schematic diagram the details of the filter means and servo means of FIG. 4.

DETAILED DESCRIPTION

Figure 1:
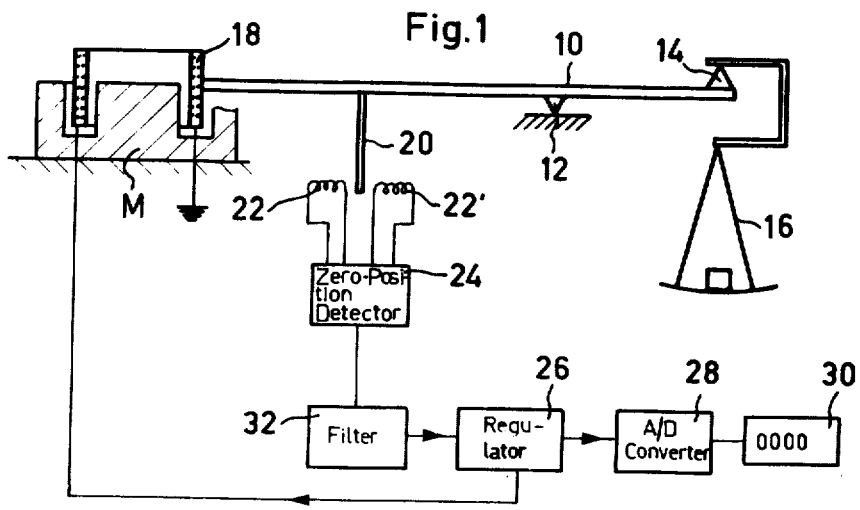
FIG. 1 is a block electrical diagram of the first embodiment of the invention including a balance beam.

Referring now to FIG. 1, the weighing apparatus is of the electromagnetic load compensation type including a balance beam 10 that pivots about fixed pivot 12 and pivotally supports at one end by pivot 14 a weighing pan 16 of the pendulum type. At the other end of the balance beam are provided electromagnetic load compensation means which includes the compensating coil 18 which is secured to the beam, and a stationary permanent magnet M. Vane 20 secured to the beam is formed of metal and extends between a pair of coils 20, 22′ that define inductance scanning means connected with the input terminals of zero-position detector means 24. The zero-position detector means produce a position signal that is a function of the displacement of weighing pan 16 and beam 10 from their initial no-load positions. In accordance with the characterizing feature of the present invention, the position signal is fed to the regulator 26 via frequency-selective means 32 the function of which will be described in greater detail below. The regulator means 26 supplies to the compensation coil 18 a compensation current the magnitude of which is a function of that of the position signal, which compensation current generates a magnetic field that reacts with the field of the permanent magnet M to tend to return the beam and the weighing pan 16 toward their initial no-load position. A signal proportional to the compensating current is supplied by the regulator 26 to the analog to digital converter 28 which digitalizes the signal for reading by the digital indication means 30, thereby to provide a visual indication of the load applied to the weighing pan 16.

Figure 2:
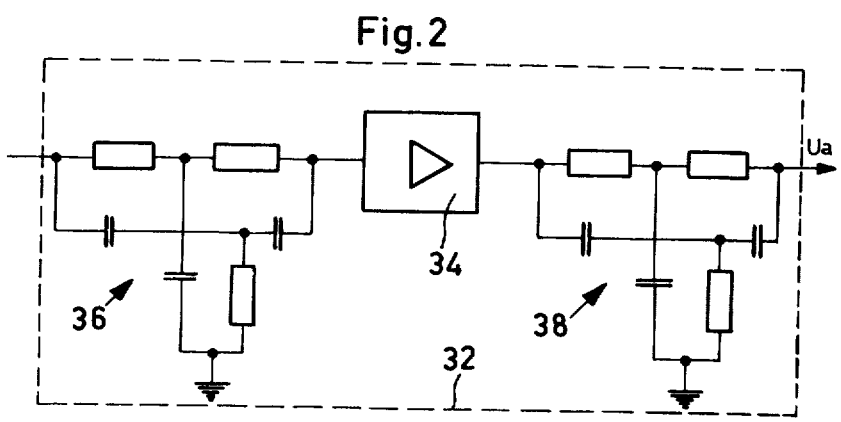
FIG. 2 is an electrical schematic diagram of the filter means of FIG. 1.

Referring now to FIG. 2, the frequency selective filter 32 is of a double-T configuration including a pair of T-shaped filters 36 and 38 connected by an isolating amplifier 34. When outside vibrations occur, it is those vibrations which correspond to the inherent resonance frequencies of the weighing apparatus that are particularly distrubing. In the instant case this is true primarily of the inherent resonance frequency of scale beam 10 (16 HZ) as well as that of the pendulating weighing pan 16 (7HZ). When interference oscillations with these frequencies occur, an interference signal is superimposed on the weighing-load-determined position signal of the zero-position detector 24 and this interference signal — due to the resonance with the particular inherent frequency of the scale — does not allow any steady weight indication to materialize. Consequently, the filter network 32 is provided for suppressing the undesirable interference frequencies. Both filters 36 and 38 are of the known double-T structure and differ from each other only in the dimensioning of their electrical components. Each of the two filters 36 and 38 forms a combination of high-pass and low-pass filter with a narrow suppression band in the region of one of the inherent frequencies of the scales. The isolation amplifier 34 serves to prevent the two filters from influencing each other. If desired, another amplifier (not illustrated) can be provided at the output of filter means 32 for adapting the position signal to the impedance of the regulator 26.

Figure 3:
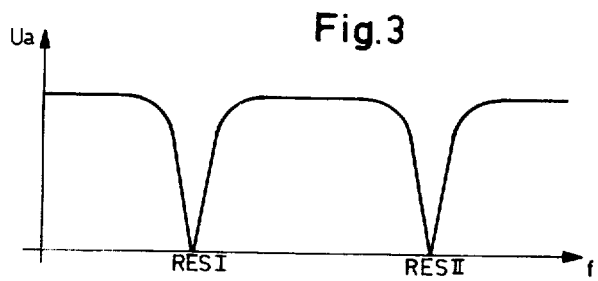
FIG. 3 illustrates the electrical characteristics of the filter means of FIG. 2.

FIG. 3 shows the electrical characteristic of filter network 32. The output signal $U_A$, outside the two suppression bands at RES I and RES II, corresponds — in a frequency - independent manner— with the input signal (i.e., the weight-dependent scanning signal from O-position detector 24). In both stop bands (RES I [7 HZ] and RES II [16 HZ]), however, in case of resonance of interference frequency with the inherent resonance frequencies of the scale, the interfering signal is not transmitted, that is to say, the regulating signal — and thus also the weight indication — will remain undisturbed.

Referring now to FIG. 4, a weighing apparatus is disclosed in which the weighing beam is eliminated and the pan support 40 for the pan 42 is biased toward the no-load position by spring means, not shown. Connected with the lower end of the pan support is an annular compensation coil 44 which, as in Example I, extends into the air gap of a permanent magnet 46. A vane 48, protruding laterally from the support 40, together with two fixed plates 50,50", forms a differential condenser which supplies the position input signal to the zero-position detector 52. The conventional part of the device is completed by the regulator 54 as well as the analog-digital converter 57 with the subsequently connected digital indication 58. The likewise conventional retention of the support 40 in the scale frame by means of a parallel guidance is likewise not shown.

As indicated above, in weighing apparatus where the weighing range is great — in comparison to the deadload, (i.e., to the inherent weight of the load receiving member itself) — one can no longer start with an approximately constant inherent frequency, since the latter changes with the load. Accordingly, in this example, there is provided a filter 56 which has a double-T structure but whose suppression band is variable. For this purpose, servo means 59 are provided which operate as follows. The weight-proportional analog signal, amplified by regulator 54, is supplied to one input of a differential amplifier 60. To the second input of the differential amplifier is supplied a voltage whose magnitude is determined by reference potentiometer 62. The polarity of the output signal of the differential amplifier 60, by means of switch control means 64, controls the position of a double-action switch 66 which in turn controls the power supply of a servo-motor 68 (forward, reverse, stop). As shown by the dot-dash lines, motor 68 is mechanically connected with the reference potentiometer 62 as well as with the three variable resistances of the double-T filter 56, whereby the drive brings about a synchronous adjustment of all four potentiometers until such time as the differential amplifier 60 becomes zero.

By appropriate dimensioning of the individual elements, the suppression band of filter 56 will in each case correspond with the load-dependent variable inherent frequency of the system. By "system" is meant either the load receiving member (40,42,44) alone, or the entire regulating circuit including the load receiving member, as desired.

The arrangement according to the invention permits several variations. For example, in some cases, simpler circuits might be provided in which a single filter (i.e. filter 36 or 38 in FIG. 2) will be entirely sufficient. In other cases, a combination of the circuits from FIGS. 1 and 4 might produce the best results. Finally, circuits may be provided which — in addition to a selective filter according to the invention — include another, nonselective filter, for example, a conventional lowpass filter. The latter have been employed on occasion in the past but, in case of resonance oscillations, they produced only poor attenuation; in case of a better attenuation effect, they produce a noticeable increase in the weighing time.

One special advantage of the selective filter — in addition to the relatively minor expenditure for the actual filter itself — is represented by the fact that its use brings about practically no additional time requirement. Only in the case of the servocircuit according to FIG. 5 is it necessary, in addition to the increased effort, to accept a certain increase in the weighing time, which, however, seems acceptable in return for the advantage of the automatic adjustment of the filter to the resonance frequency because the selective filter renders the scale insensitive to fast outside force changes without slowing it down during the weighing process.

While in accordance with the provisions of the Patent Statutes, the preferred forms and embodiments have been illustrated and described, it will be apparent to those skilled in the art that other modifications may be made without deviating from the inventive concepts set forth above.

What is claimed is:

1. In a weighing apparatus of the electromagnetic load compensation type including weighing pan means (16,42) movable between no-load and load positions relative to fixed support means; zero-position detector means (24,52) for producing a weighing pan position signal that is a function of the extent of displacement of the weighing pan from its no-load position; electromagnetic means including a compensation coil (18,44) associated with one of said weighing pan and support means; regulator means (26, 54) for supplying to said compensation coil a compensating current that is a function of said weighing pan displacement signal; and indicator means (30,58) responsive to the magnitude of the compensating current for providing an indication of the magnitude of the load applied to the weighing pan means; the improvement which comprises band-rejection filter means (32,56) connected between said zero-position detector means and said regulator means for suppressing from the pan position signal those discrete frequencies, resulting from forces imparted to the weighing apparatus by shock or vibration, which correspond with the inherent resonance frequencies of the weighing apparatus.

2. Apparatus as defined in claim 1, wherein said filter means suppresses interference oscillations relative to the inherent resonance frequency of the entire regulating circuit.

3. Apparatus as defined in claim 1, wherein said filter means is operable to suppress a plurality of discrete interference frequencies.

4. In a weighing apparatus of the electromagnetic load compensation type including weighing pan means (16,42) movable between no-load and load positions relative to fixed support means; zero-position detector means (24,52) for producing a weighing pan position signal that is a function of the extent of displacement of the weighing pan from its no-load position; electromagnetic means including a compensation coil (18,44) associated with one of said weighing pan and support means; regulator means (26,54) for supplying to said compensation coil a compensating current that is a function of said weighing pan displacement signal; and indicator means (30,58) responsive to the magnitude of the compensating current for providing an indication of the magnitude of the load applied to the weighing pan means; the improvement which comprises high-pass and low-pass band-rejection filter means of the double-T type (36,38) connected in series between said zero-position detector means and said regulator means for suppressing from the pan position signal a plurality of discrete interference frequencies, resulting from forces imparted to the weighing apparatus by shock or vibration, which correspond with the inherent resonance frequencies of the weighing apparatus.

5. In a weighing apparatus of the electromagnetic load compensation type, including weighing pan means (16,42) movable between no-load and load positions relative to fixed support means; zero-position detector means (24,52) for producing a weighing pan position signal that is a function of the extent of displacement of the weighing pan from its no-load position; electromagnetic means including a compensation coil (18,44) associated with one of said weighing pan and support means; regulator means (26,54) for supplying to said compensation coil a compensating current that is a function of said weighing pan displacement signal; and indicator means (30,58) responsive to the magnitude of the compensating current for providing an indication of the magnitude of the load applied to the weighing pan means; the improvement which comprises a. high-pass and low-pass band-rejection filter means of the double-T type connected in series between said zero-position detector means and said regulator means for suppressing from the pan position signal those discrete frequencies, resulting from forces imparted to the weighing apparatus by shock or vibration, which correspond with the inherent resonance frequencies of the weighing apparatus; and b. an isolation amplifier (34) connected between the T portions of the double-T filter arrangement for preventing the two filter portions from influencing each other.

6. In a weighing apparatus of the electromagnetic load compensation type, including weighing pan means (15,42) movable between no-load and load positions relative to fixed support means; zero-position detector means (24,52) for producing a weighing pan position signal that is a function of the extent of displacement of the weighing pan from its no-load position; electromagnetic means including a compensation coil (18,44) associated with one of said weighing pan and support means; regulator means (26,54) for supplying to said compensation coil a compensating current that is a function of said weighing pan displacement signal; and indicator means (30,58) responsive to the magnitude of the compensating current for providing an indication of the magnitude of the load applied to the weighing pan means; the improvement which comprises a. band-rejection filter means connected in series between said zero-position detector means and said regulator means for suppressing from the pan position signal those discrete frequencies, resulting from forces imparted to the weighing apparatus by shock or vibration, which correspond with the inherent resonance frequecies of the weighing apparatus, said filter means including capacitive and impedance components at least some of which are variable; and b. means (59) for varying the electrical characteristics of selected ones of said filter components as a function of the magnitude of the compensation current.

7. Apparatus as defined in claim 6, wherein said means for varying the electrical characteristics of the filter components includes a variable source of reference potential (62), means (60) for comparing the reference potential with a potential that is a function of the magnitude of the compensating current, thereby to produce a comparison signal, and servo means (68) responsive to the comparison signal for simultaneously adjusting said filter components and said reference potential source to reduce the comparison signal to zero.

8. In a weighing apparatus of the electromagnetic load compensation type including weighing pan means (16,42) movable between no-load and load positions relative to fixed support means; zero-position detector means (24,52) for producing a weighing pan position signal that is a function of the extent of displacement of the weighing pan from its no-load position; electromagnetic means including a compensation coil (18,44) associated with one of said weighing pan and support means; regulator means (26,54) for supplying to said compensation coil a compensating current that is a function of said weighing pan displacement signal; and indicator means (30,58) responsive to the magnitude of the compensating current for providing an indication of the magnitude of the load applied to the weighing pan means; the improvement which comprises a. band-rejection filter means (24,56) connected between said zero-position detector means and said regulator means for suppressing from the pan position signal those discrete frequencies, resulting from forces imparted to the weighing apparatus by shock or vibration, which correspond with the inherent resonance frequencies of the weighing apparatus, said filter means including capacitive and impedance components at least some of which are variable; and b. means for varying the electrical characteristics of selected ones of said filter components as a function of the magnitude of the compensation current, said electrical characteristic varying means including a variable source of reference potential (62), comparison means (60) including a differential amplifier (60) for comparing the reference potential with a potential that is a function of the magnitude of the compensating current, thereby to produce a comparison signal, servo means including a reversible electric motor (68) responsive to the comparison signal for simultaneously adjusting said filter components and said reference potential source to reduce the comparison signal to zero, and polarity-responsive switch means (64,66) responsive to the polarity of the comparison signal for controlling the direction of operation of said reversible electric motor.

* * * * *